United States Patent
Lee et al.

(10) Patent No.: US 9,588,618 B2
(45) Date of Patent: Mar. 7, 2017

(54) DISPLAY DEVICE WITH TOUCH SENSING UNIT THAT COMPENSATES FOR DISPLAY DATA AND TOUCH SENSING METHOD THEREOF

(71) Applicant: LG Display Co., Ltd., Seoul (KR)

(72) Inventors: Jung Han Lee, Gyeonggi-do (KR);
Sung Chul Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 186 days.

(21) Appl. No.: 14/045,048

(22) Filed: Oct. 3, 2013

(65) Prior Publication Data
US 2014/0160086 A1    Jun. 12, 2014

(30) Foreign Application Priority Data
Dec. 7, 2012   (KR) .......................... 10-2012-0142365

(51) Int. Cl.
   *G06F 3/041*    (2006.01)
(52) U.S. Cl.
   CPC .................................. *G06F 3/0418* (2013.01)
(58) Field of Classification Search
   CPC ...... G06F 3/044; G06F 3/0412; G06F 3/0418; G06F 3/0416; G02F 1/13338
   See application file for complete search history.

(56) References Cited

U.S. PATENT DOCUMENTS

| | | | |
|---|---|---|---|
| 2010/0090967 A1 | 4/2010 | Jang | |
| 2010/0193258 A1* | 8/2010 | Simmons | G06F 3/044 178/18.06 |
| 2010/0271322 A1* | 10/2010 | Kondoh | G06F 3/0416 345/173 |
| 2010/0295824 A1* | 11/2010 | Noguchi et al. | 345/175 |
| 2011/0127092 A1* | 6/2011 | Lu | G06F 3/0416 178/18.06 |

(Continued)

FOREIGN PATENT DOCUMENTS

| | | |
|---|---|---|
| CN | 101727226 A | 6/2010 |
| CN | 102236464 A | 11/2011 |

(Continued)

OTHER PUBLICATIONS

Internet Archive Wayback Machine, Definition of "calculate" https://web.archive.org/web/20121101060642/http://www.merriam-webster.com/dictionary/calculate.*

(Continued)

*Primary Examiner* — Lun-Yi Lao
*Assistant Examiner* — Elliott Deaderick
(74) *Attorney, Agent, or Firm* — Morgan, Lewis & Bockius LLP (57) ABSTRACT

Provided are a display device and a touch sensing method of a display device. The display device includes a timing controller temporally dividing one frame period and driving a display panel such that a display mode for displaying an image in the display panel and a touch mode for sensing a user's touch are alternately driven, and a touch sensing unit detecting the user's touch with a touch raw data difference between adjacent touch sensing blocks in the touch mode. In the display mode, the touch sensing unit generates a display compensation value for compensating for an error of the touch raw data due to a differential of display data applied to the adjacent touch sensing blocks to detect the user's touch.

7 Claims, 8 Drawing Sheets

(56) References Cited

U.S. PATENT DOCUMENTS

| | | | |
|---|---|---|---|
| 2011/0261007 A1 | 10/2011 | Joharapurkar et al. | |
| 2011/0267293 A1 | 11/2011 | Noguchi et al. | |
| 2011/0298746 A1* | 12/2011 | Hotelling | 345/174 |
| 2011/0316794 A1* | 12/2011 | Chang | G06F 3/0418 345/173 |
| 2012/0056835 A1* | 3/2012 | Choo et al. | 345/173 |
| 2012/0182251 A1* | 7/2012 | Krah | 345/174 |
| 2012/0268144 A1 | 10/2012 | Ahn | |
| 2013/0328790 A1* | 12/2013 | Liu | G06F 3/0418 345/173 |

FOREIGN PATENT DOCUMENTS

| | | |
|---|---|---|
| CN | 102262490 A | 11/2011 |
| CN | 102402330 A | 4/2012 |
| CN | 102750057 A | 10/2012 |

OTHER PUBLICATIONS

Internet Archive Wayback Machine, Definition of "determine" https://web.archive.org/web/20121106042003/http://www.merriam-webster.com/dictionary/determine.*
The First Office Action dated Apr. 1, 2016, from The Statement Intellectual Property Office of the People's Republic of China in counterpart Chinese application No. 201310406919.6.

* cited by examiner

FIG. 1

Related Art

FIG. 2

Related Art

FIG. 3

Related Art

FIG. 4

Related Art

FIG. 9 n+1st Touch Sensing Block

| | 1 | 2 | 3 | 4 | ... | ... | 252 | 253 | 254 | 255 | 256 |
|---|---|---|---|---|---|---|---|---|---|---|---|
| 1 | 0 | Y1 | Y2 | Y4 | | | | | | | |
| 2 | -X1 | 0 | Y3 | Y5 | | | | | | | |
| 3 | -X2 | -X3 | 0 | Y6 | | | | | | | |
| 4 | -X4 | -X5 | -X6 | 0 | | | | | | | |
| | | | | | 0 | | | | | | |
| | | | | | | 0 | | | | | |
| 252 | | | | | | | 0 | | | | |
| 253 | | | | | | | | 0 | | | |
| 254 | | | | | | | | | 0 | Yn-2 | Yn-1 |
| 255 | | | | | | | | | -Xn-2 | 0 | Yn |
| 256 | | | | | | | | | -Xn-1 | -Xn | 0 |

Nth Touch Sensing Block

FIG. 10 n+1st Touch Sensing Block

| | 1 | 30 | 60 | ... | 249 | 250 | 256 |
|---|---|---|---|---|---|---|---|
| 1 | 0 | Y1 | Y2 | Y4 | | | |
| 2 | -X1 | 0 | Y3 | Y5 | | | |
| 3 | -X2 | -X3 | 0 | Y6 | | | |
| ... | -X4 | -X5 | -X6 | 0 | | | |
| 249 | | | | | 0 | Yn-2 | Yn-1 |
| 250 | | | | | -Xn-2 | 0 | Yn |
| 256 | | | | | -Xn-1 | -Xn | 0 |

Nth Touch Sensing Block

DISPLAY DEVICE WITH TOUCH SENSING UNIT THAT COMPENSATES FOR DISPLAY DATA AND TOUCH SENSING METHOD THEREOF

CROSS-REFERENCE TO RELATED APPLICATIONS

This application claims the benefit of the Korean Patent Application No. 10-2012-0142365 filed on Dec. 7, 2012, which is hereby incorporated by reference as if fully set forth herein.

BACKGROUND

Field of the Invention

The present invention relates to a display device and a touch sensing method thereof, and more particularly, to a display device with a built-in touch sensor and a touch sensing method thereof.

Discussion of the Related Art

With the advancement of various portable electronic devices such as mobile terminals and notebook computers, the demand for flat panel display devices applied to the portable electronic devices is increasing.

Liquid crystal display (LCD) devices, plasma display panels (PDPs), field emission display (FED) devices, light emitting diode (LED) display devices, and organic light emitting diode (OLED) display devices have been developed as flat panel display devices.

In such flat panel display devices, LCD devices are easily manufactured by advanced manufacturing technology and have drivability of drivers, low power consumption, high image quality, and a large screen, and thus, the application fields of the LCD devices are being expanded. LCD devices, including a built-in touch screen that enables a user to directly input information to a screen with a finger or a pen, are attracting much attention.

In applying a touch screen to LCD devices, a separately prepared touch panel is conventionally disposed on a liquid crystal panel, but, the LCD devices are recently developed in a type where the touch screen is built in a liquid crystal panel for slimming.

Especially, LCD devices using the existing elements, such as common electrodes formed in a lower substrate, as touch sensing electrodes are called in-cell touch LCD devices.

Figure 1:
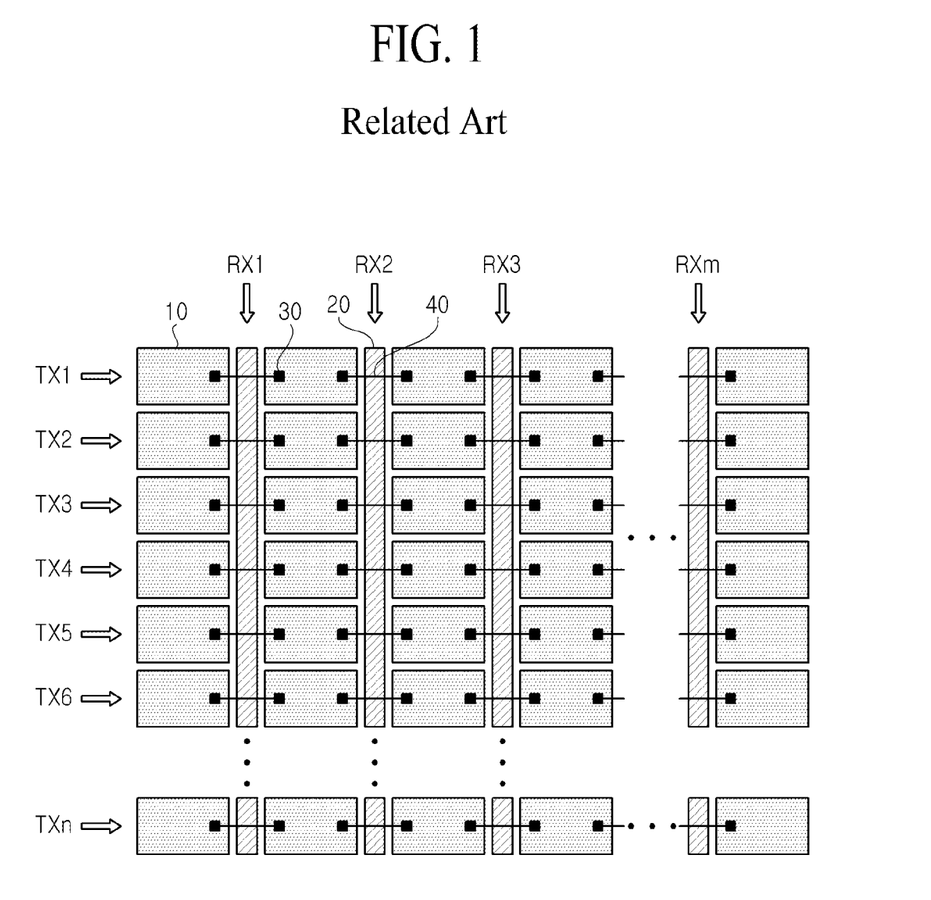
FIG. 1 is a diagram illustrating a structure of a touch screen panel in a related art in-cell touch type LCD device.

FIG. 1 is a diagram illustrating a structure of a touch screen panel in a related art in-cell touch type LCD device.

Referring to FIG. 1, the in-cell touch type LCD device uses a plurality of common electrodes, formed in a lower substrate (TFT array substrate), for display, and moreover uses the common electrodes as touch electrodes. In this case, the common electrodes are divided in units of pixels to configure a plurality of touch sensing blocks.

Specifically, among a plurality of pixels provided in the LCD device, a certain number of pixels (for example, 64×64 pixels) configures one touch sensing block. A plurality of touch sensing blocks are connected to each other in an X-axis direction to configure a plurality of touch driving electrodes 10 (TX), and a plurality of touch sensing electrodes 20 (RX) are arranged in a stripe type in a Y-axis direction. The touch driving electrodes 10 may be arranged in the X-axis direction identically to a direction of a gate line, and the touch sensing electrodes 20 may be arranged in the Y-axis direction identically to a direction of a data line.

In this case, a touch driving signal is applied to the touch driving electrodes 10 (TX), and the touch sensing electrodes 20 (RX) sense a capacitance change.

In in-cell touch LCD devices, display and touch sensing are temporally divided and driven due to a structural characteristic in which a plurality of pixels for display and a touch screen for touch detection are provided together.

During a touch sensing period (non-display period), when a capacitance is changed in a touch sensing block touched by a user's finger, a touch sensing electrode senses the changed capacitance, thereby determining whether there is the user's touch and a touched position.

In the related art, however, when touch sensors are disposed outside a liquid crystal panel, a display function and a touch sensing function are separately performed, and thus are not affected by each other. On the other hand, when the touch sensors are built in the liquid crystal panel, the display function and the touch sensing function are affected by each other. That is, touch sensing driving can affect display driving, or, the display driving can affect the touch sensing driving. This will now be described in more detail with reference to FIG. 2.

Figure 2:
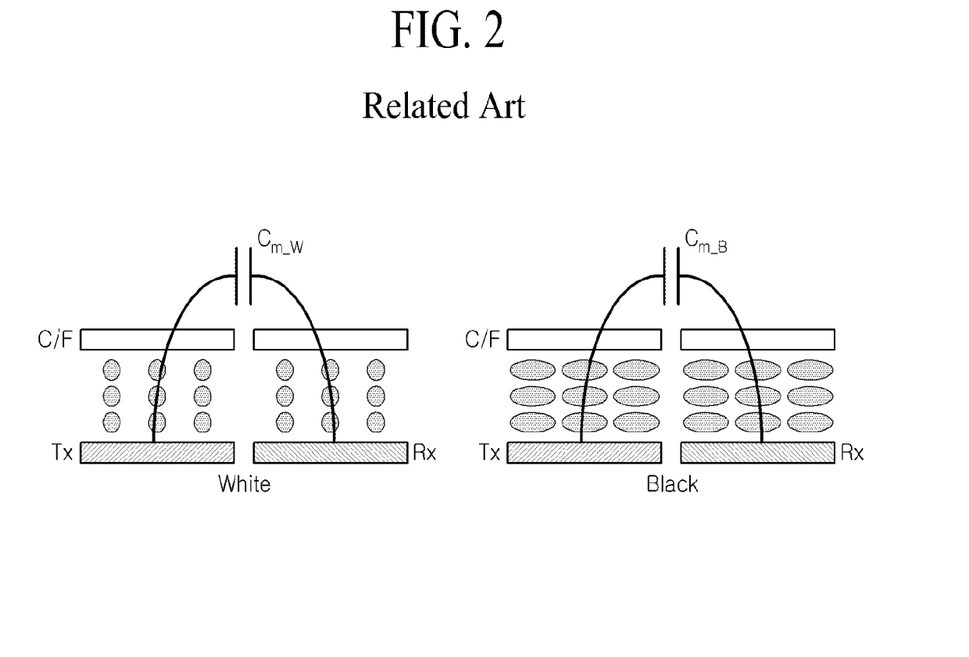
FIG. 2 is a view showing a capacitance change in a pixel displaying black and a capacitance change in a pixel displaying white, in the related art in-cell touch type LCD device.

FIG. 2 is a view showing a capacitance change in a pixel displaying black and a capacitance change in a pixel displaying white, in the related art in-cell touch type LCD device.

As seen in FIG. 1, a pixel "Black" displaying black and a pixel "White" displaying white differ in alignment of liquid crystal, and thus, a difference between capacitances of a liquid crystal layer occurs.

The capacitance difference between pixels is maintained in the pixels even after a touch sensing period is started, and affects touch sensitivity. The capacitance difference functioning like offset to act as noise to touch sensing is called display touch crosstalk.

The accuracy and stability of a touch being reduced by the display touch crosstalk causes a bigger problem to a differential capacitive touch type in which a touch is sensed with a capacitance difference between adjacent touch sensing electrodes. This will be described in detail with reference to FIG. 3.

Figure 3:
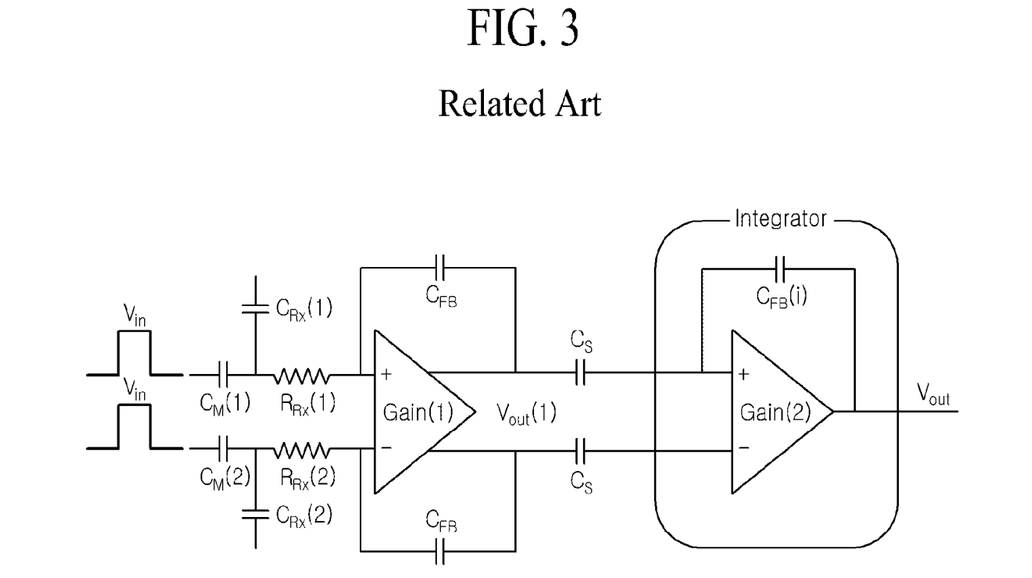
FIG. 3 is a diagram for describing a differential capacitive touch type in the related art in-cell touch type LCD device.

FIG. 3 is a diagram for describing a differential capacitive touch type in the related art in-cell touch type LCD device.

As seen in FIG. 3, in the differential capacitive touch type, the LCD device amplifies a capacitance difference (Cm(1)-Cm(2)) between adjacent touch sensing electrodes to determine whether there is a touch.

However, for example, when a pixel corresponding to one of adjacent touch sensing electrodes displays black and a pixel corresponding to the other displays white, a capacitance difference of a liquid crystal layer in the pixels displaying black and white acts like offset to a capacitance difference based on a touched position, causing display touch crosstalk. This will be described in detail with reference to FIG. 4.

Figure 4:
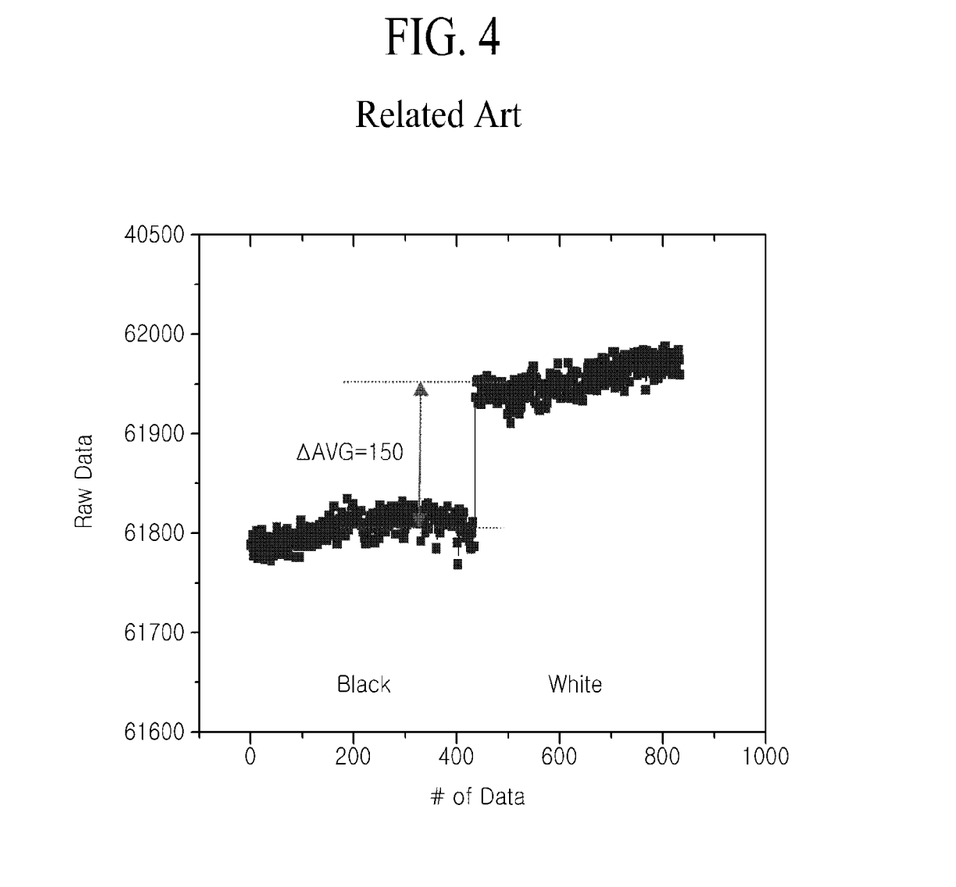
FIG. 4 is a diagram showing a touch raw data difference between a touch sensing block displaying black and a touch sensing block displaying white in the related art in-cell touch type LCD device.

FIG. 4 is a diagram showing a touch raw data difference between a touch sensing block displaying black and a touch sensing block displaying white in the related art in-cell touch type LCD device.

As seen in FIG. 4, the touch raw data difference between the touch sensing block displaying black and the touch sensing block displaying white is an average of 150 degrees. That is, even when there is no user's touch, a touch raw data difference is caused by a difference of display information displayed by a pixel corresponding to a corresponding touch sensing block.

For this reason, when a touch threshold value for detecting whether there is a user's touch is 100, even though there is no user's actual touch, a touch can be sensed.

SUMMARY

Accordingly, the present invention is directed to provide a display device and a touch sensing method thereof that substantially obviate one or more problems due to limitations and disadvantages of the related art.

An aspect of the present invention is directed to provide a display device and a touch sensing method thereof, which correct display touch crosstalk to sense a user's touch.

Another aspect of the present invention is directed to provide a display device and a touch sensing method thereof, which correct display touch crosstalk to a user's touch, thus enhancing a touch sensing rate.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device including: a timing controller temporally dividing one frame period and driving a display panel such that a display mode for displaying an image in the display panel and a touch mode for sensing a user's touch are alternately driven; and a touch sensing unit detecting the user's touch with a touch raw data difference between adjacent touch sensing blocks in the touch mode, wherein, in the display, the touch sensing unit generates a display compensation value for compensating for an error of the touch raw data due to a differential of display data applied to the adjacent touch sensing blocks to detect the user's touch.

In another aspect of the present invention, there is provided a touch sensing method of a display device, which temporally divides one frame period and drives a display panel such that a display mode for displaying an image in the display panel and a touch mode for sensing a user's touch are alternately driven, including: receiving a touch raw data difference between adjacent touch sensing blocks in the touch mode; generating a display compensation value for compensating for an error of the touch raw data due to a differential of display data applied to the adjacent touch sensing blocks, in the display mode; and adding the display compensation value to the touch raw data difference to detect the user's touch.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, a display device and a touch sensing method thereof according to the present invention will be described in detail with reference to the accompanying drawings.

In an embodiment, a display device according to the present invention may be an LCD device. Hereinafter, for convenience, the LCD device will be described as an example of the display device according to the present invention. However, the display device according to the present invention is not limited to the LCD device.

LCD devices are variously developed in a twisted nematic (TN) mode, a vertical alignment (VA) mode, an in-plane switching (IPS) mode, or a fringe field switching (FFS) mode depending on a scheme of adjusting the alignment of liquid crystal.

In such modes, the IPS mode and the FFS mode are modes in which a plurality of pixel electrodes and common electrodes are arranged on a lower substrate, and thus, the alignment of liquid crystal is adjusted with electric fields between the pixel electrodes and the common electrodes.

The present invention may be applied to an LCD device having a structure in which a plurality of pixels electrodes and common electrodes are disposed on a lower substrate as in the IPS mode or the FFS mode.

However, the present invention is not limited thereto, and may be an LCD device having a structure in which the pixel electrodes are disposed on the lower substrate and the common electrodes are disposed on an upper substrate as in the TN mode or the VA mode.

Figure 5:
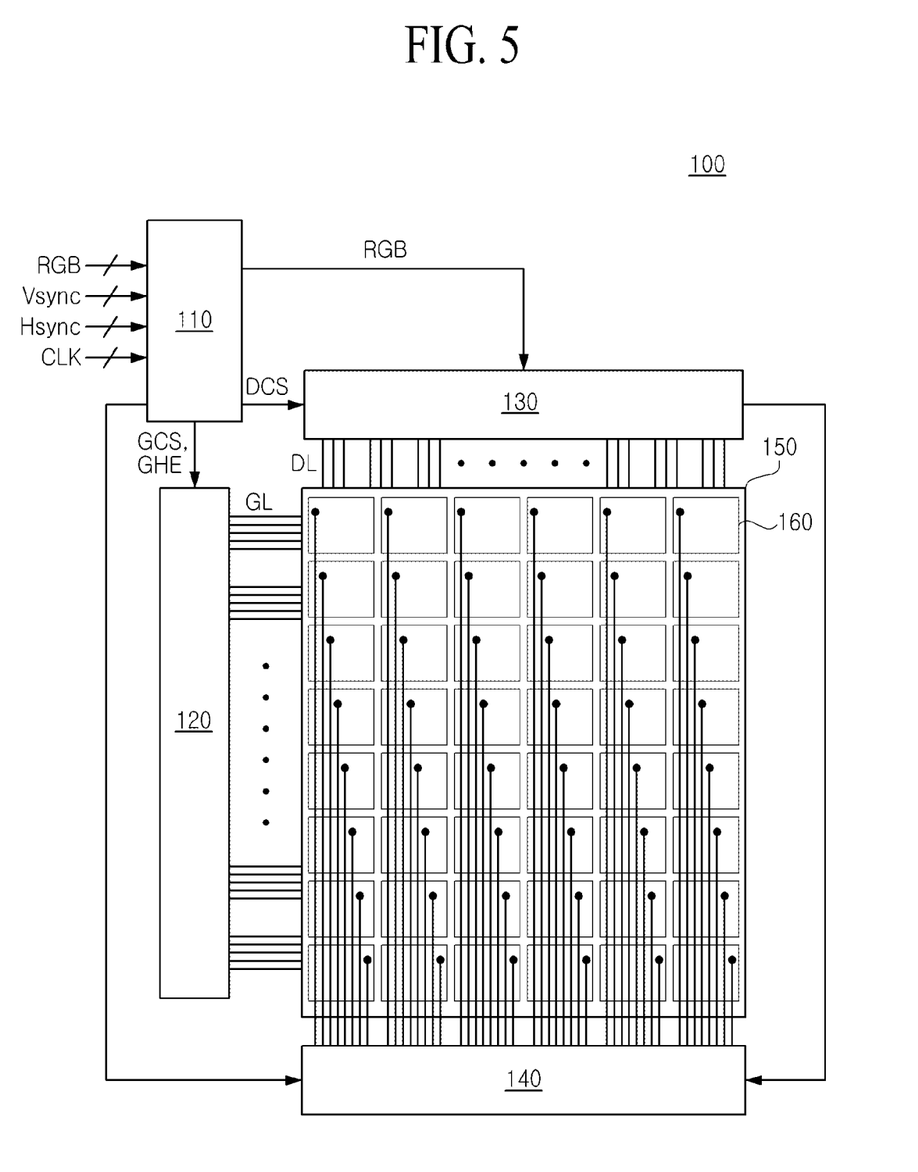
FIG. 5 is a diagram illustrating an embodiment of a display device according to the present invention.

FIG. 5 is a diagram illustrating an embodiment of a display device according to the present invention.

As seen in FIG. 5, a display device 100 according to the present invention includes a timing controller 110, a gate driver 120, a data driver 130, a touch sensing unit 140, a display panel 150, and a plurality of touch sensing blocks 160.

The timing controller 110 temporally divides one frame period and drives the display panel 150 such that a display mode for displaying an image in the display panel 150 and a touch mode for sensing a user's touch are alternately driven.

In the display mode, the timing controller 110 aligns external video signals to convert the video signals into frame-unit digital image data RGB, and supplies the digital image data to the data driver 130.

In the display mode, the timing controller 110 generates a gate control signal GCS for controlling the gate driver 120 and a data control signal DCS for controlling the data driver 130 with a vertical sync signal Vsync, a horizontal sync signal Hsync, and a clock signal CLK which are input from the outside.

The gate control signal GCS is supplied to the gate driver 120, and the data control signal DCS is supplied to the data driver 130.

Here, the data control signal DCS may include a source start pulse SSP, a source sampling clock SSC, a source output enable signal SOE, and a polarity control signal POL.

The gate control signal GCS may include a gate start pulse GSP, a gate shift clock GSC, and a gate output enable signal GOE.

The following description will be made of an operation in which the display mode for displaying an image in the display panel 150 and the touch mode for sensing a user's touch are temporally divided and alternately driven by the timing controller 110 during one frame period.

Figure 6:
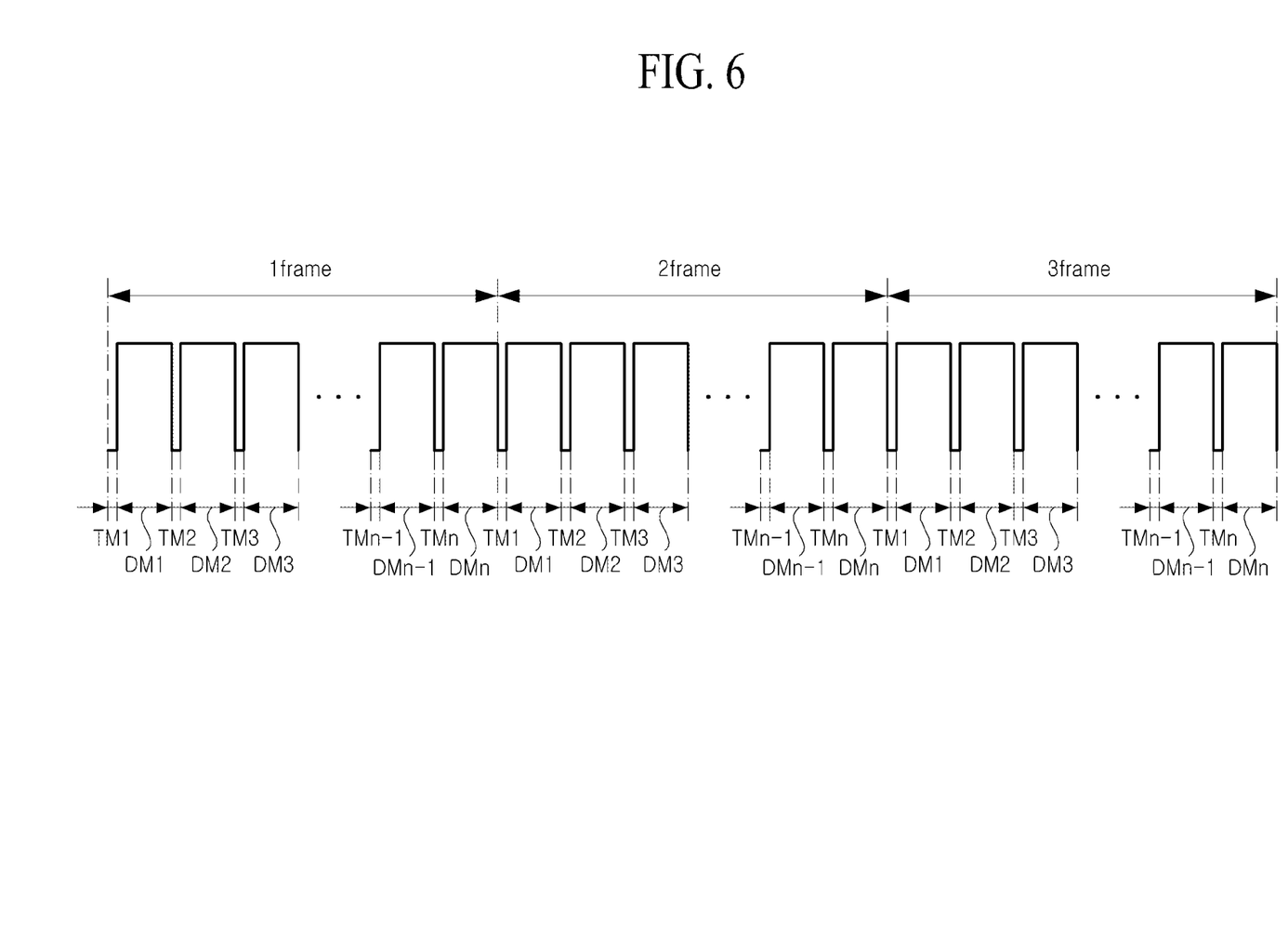
FIG. 6 is a diagram showing that a display mode and a touch mode are time-division driven alternately in the display device according to the present invention.

FIG. 6 is a diagram showing that the display mode and the touch mode are time-division driven alternately in the display device according to the present invention.

As seen in FIG. 6, the timing controller 110 of the display device 100 according to the present invention temporally divides one frame period and time-division drives the display panel 150 such that the display mode DM for displaying an image in the display panel 150 and the touch mode TM for sensing a user's touch are alternately driven.

The display mode denotes a mode for displaying a desired image in the display panel 150, and the touch mode denotes a mode for sensing a touch position of a user that touches the display panel 150.

In an embodiment, when the touch sensing blocks 160 are disposed in n number of rows in a direction parallel to the gate line in the display panel 150, the timing controller 110 alternately drives the touch mode TM and the display mode DM n number of times so as to enable the sensing of a user's touch by using the touch sensing blocks 160 disposed in all rows during one frame.

Specifically, the timing controller 110 drives a touch mode TM1 and a display mode DM1 on a touch sensing block 160 disposed in a first row during one frame period, drives a touch mode TM2 and a display mode DM2 on a touch sensing block 160 disposed in a second row during one frame period, drives a touch mode TM(n−1) and a display mode DM(n−1) on a touch sensing block 160 disposed in an n−1 st row during one frame period, and drives a touch mode TMn and a display mode DMn on a touch sensing block 160 disposed in an nth row during one frame period, thereby time-division controlling the touch sensing block 160 disposed in a total of n rows.

According to an embodiment, in a XGA-class TFT-LCD device including 768 gate lines as an example, a time for which a thin film transistor (TFT) connected to a gate line is turned on is 21 usec or less, and, when the TFT is refreshed at a speed of 60 frames per second, one frame time is 16.7 msec. Therefore, the touch mode and the display mode are repeatedly performed at intervals of 16.7 ms.

In this case, the touch mode is maintained for a time relatively shorter than a maintenance time of the display mode. That is, the touch mode is maintained and driven for a short time between the touch mode and the display mode, and thus does not affect the quality of an image displayed by a liquid crystal panel. In an embodiment, the touch mode may be driven for one-tenth, one-fortieth, or less of a time for which the display mode is driven.

The gate driver 120 turns on a plurality of switching elements connected to a gate line for displaying an image in the display mode. In an embodiment, the gate driver 120 may receive a signal from the timing controller 110 to apply a gate high voltage (VGH) to the gate line, thereby turning on the switching elements.

When the switching elements connected to the gate line are turned on, the data driver 130 outputs display data to the data lines. Here, the display data may be grayscale values including grayscale information for displaying an image.

The touch sensing unit 140 determines the user's touch with touch raw data input from an adjacent touch sensing block 160 in the touch mode.

Moreover, the touch sensing unit 140 may determine the user's touch with a differential of display information displayed by the adjacent touch sensing block in the display mode, but the display device according to the present invention is not limited thereto.

Hereinafter, the touch sensing unit 140 will be described in more detail with reference to the drawing.

Figure 7:
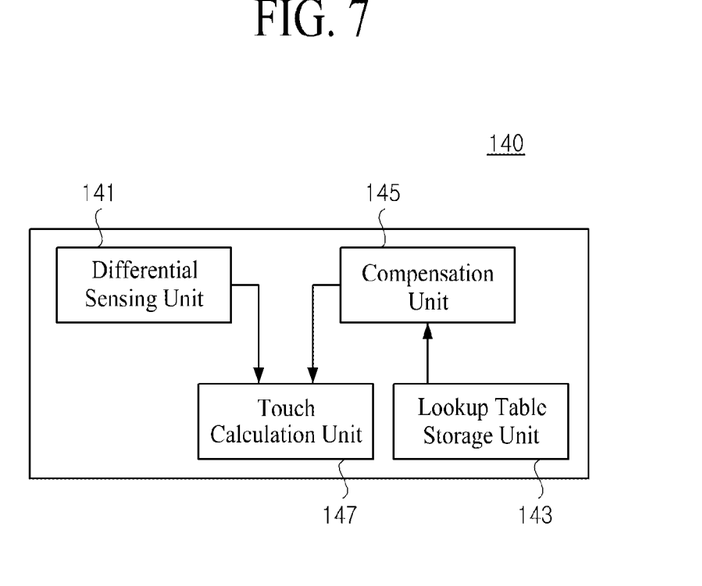
FIG. 7 is a diagram illustrating an embodiment of a touch sensing unit in the display device according to the present invention.

FIG. 7 is a diagram illustrating an embodiment of the touch sensing unit in the display device according to the present invention.

As seen in FIG. 7, in an embodiment, the touch sensing unit 140 of the display device according to the present invention includes a differential sensing unit 141, a lookup table storage unit 143, a compensation unit 145, and a touch calculation unit 147.

In the touch mode, the differential sensing unit 141 receives first touch raw data from a first touch sensing block, receives second touch raw data from a second touch sensing block adjacent to the first touch sensing block, and senses a difference between the first touch raw data and the second touch raw data.

Figure 8:
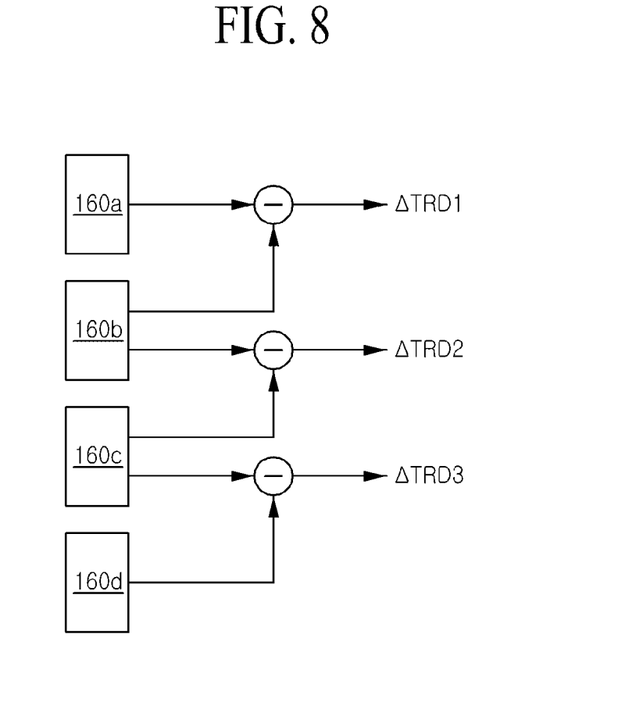
FIG. 8 is a diagram illustrating an embodiment of a differential sensing unit included in the display device according to the present invention.

FIG. 8 is a diagram illustrating an embodiment of the differential sensing unit included in the display device according to the present invention.

As seen in FIG. 8, the differential sensing unit 141 receives the first touch raw data from the first touch sensing block 160a, receives the second touch raw data from the second touch sensing block 160b adjacent to the first touch sensing block 160a, and senses a difference between the first and second touch raw data as a change amount (ΔTRD1) of the first touch raw data which is a change amount of touch raw data of the first touch sensing block 160*a*.

The differential sensing unit 141 receives the second touch raw data from the second touch sensing block 160*b*, receives third touch raw data from a third touch sensing block 160*c* adjacent to the second touch sensing block 160*b*, and senses a difference between the second and third touch raw data as a change amount (ΔTRD2) of the second touch raw data which is a change amount of touch raw data of the second touch sensing block 160*b*.

The differential sensing unit 141 receives the third touch raw data from the third touch sensing block 160*c*, receives fourth touch raw data from a fourth touch sensing block 160*d* adjacent to the third touch sensing block 160*c*, and senses a difference between the third and fourth touch raw data as a change amount (ΔTRD3) of the third touch raw data which is a change amount of touch raw data of the third touch sensing block 160*c*.

Referring again to FIG. 7, in the display mode, the lookup table storage unit 143 stores a compensation lookup table in which display data applied to a plurality of pixels corresponding to the touch sensing block 160 are respectively mapped to the change amounts of touch raw data.

Figure 9:
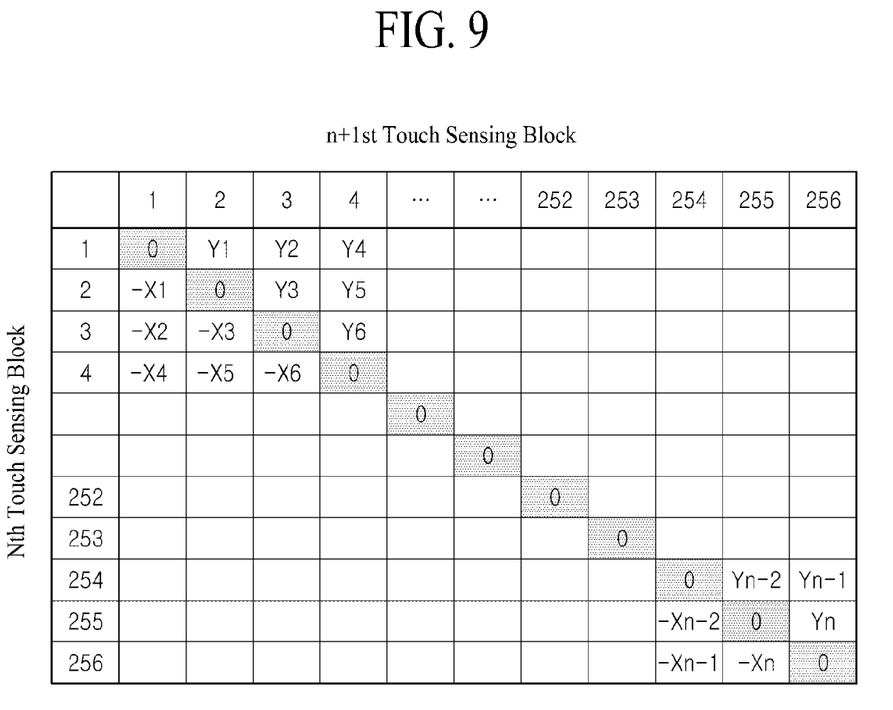
FIG. 9 is a diagram showing an embodiment of a lookup table stored in a lookup table storage unit included in the display device according to the present invention.

FIG. 9 is a diagram showing an embodiment of a lookup table stored in the lookup table storage unit included in the display device according to the present invention.

As seen in FIG. 9, the lookup table storage unit 143 receives a first average value of display data applied to a plurality of pixels corresponding to an nth touch sensing block and a second average value of display data applied to a plurality of pixels corresponding to an n+1 st touch sensing block adjacent to the nth touch sensing block, and stores a compensation lookup table in which the first and second average values are respectively mapped to the change amounts of touch raw data.

According to an embodiment, in the compensation lookup table, average values of the display data applied to the plurality of pixels corresponding to the nth touch sensing block are placed as values of 1 to 256 on the ordinate axis, and average values of the display data applied to the plurality of pixels corresponding to the n+1 st touch sensing block are placed as values of 1 to 256 on the abscissa axis. A change amount of touch raw data of the nth touch sensing block is recorded in the compensation lookup table according to the average values of the respective display data.

Figure 10:
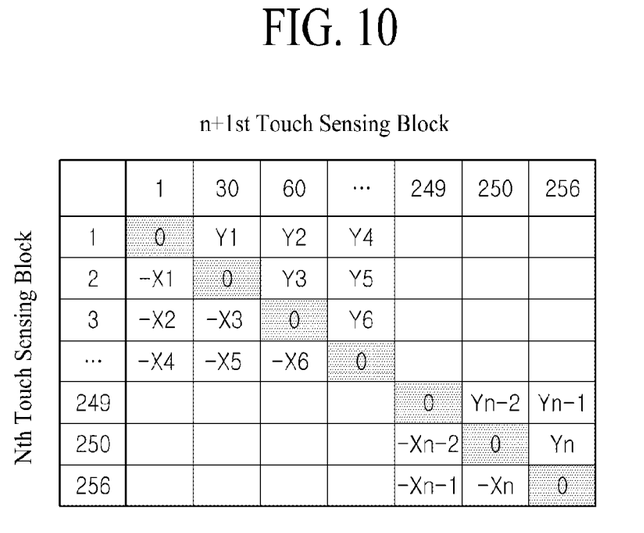
FIG. 10 is a diagram showing another embodiment of the compensation lookup table stored in the lookup table storage unit included in the display device according to the present invention.

FIG. 10 is a diagram showing another embodiment of the compensation lookup table stored in the lookup table storage unit included in the display device according to the present invention.

As seen in FIG. 10, the lookup table storage unit 143 receives the first average value of display data applied to the plurality of pixels corresponding to the nth touch sensing block and the second average value of display data applied to the plurality of pixels corresponding to the n+1st touch sensing block adjacent to the nth touch sensing block, and stores a compensation lookup table in which the first and second average values are respectively mapped to the change amounts of touch raw data.

According to another embodiment, in the compensation lookup table, average values of the display data applied to the plurality of pixels corresponding to the nth touch sensing block are placed as values (which are calculated by sampling values of 1 to 256 at predetermined intervals) on the ordinate axis, and average values of the display data applied to the plurality of pixels corresponding to the n+1st touch sensing block are placed as values (which are calculated by sampling values of 1 to 256 at predetermined intervals) on the abscissa axis. The change amount of touch raw data of the nth touch sensing block is recorded in the compensation lookup table according to the average values of the respective display data.

Unlike the embodiment of FIG. 9, when the compensation lookup table consists of values sampled at predetermined intervals, the compensation lookup table is reduced in size, and thus, it is unable to perform faster calculation in sensing a touch. In this case, however, a value unrecorded in the compensation lookup table may be calculated with a value adjacent to a corresponding grayscale value.

Referring to FIG. 7, in the display mode, the compensation unit 145 receives the first average value of display data applied to the plurality of pixels corresponding to the first touch sensing block and the second average value of display data applied to the plurality of pixels corresponding to the second touch sensing block adjacent to the first touch sensing block, and generates a display compensation value by applying the first and second average values to the compensation lookup table in which display data are respectively mapped to the change amounts of touch raw data.

That is, the compensation unit 145 finds a change amount of touch raw data matched by respectively substituting the first and second average values into the abscissa axis and the ordinate axis, and generates the found change amount as a display compensation value of the first touch sensing block.

The touch calculation unit 147 adds the display compensation value to a change amount of touch raw data which is a difference between the first touch raw data of the first touch sensing block and the second touch raw data of the second touch sensing block adjacent to the first touch sensing block, thereby detecting a user's touch.

Figure 11:
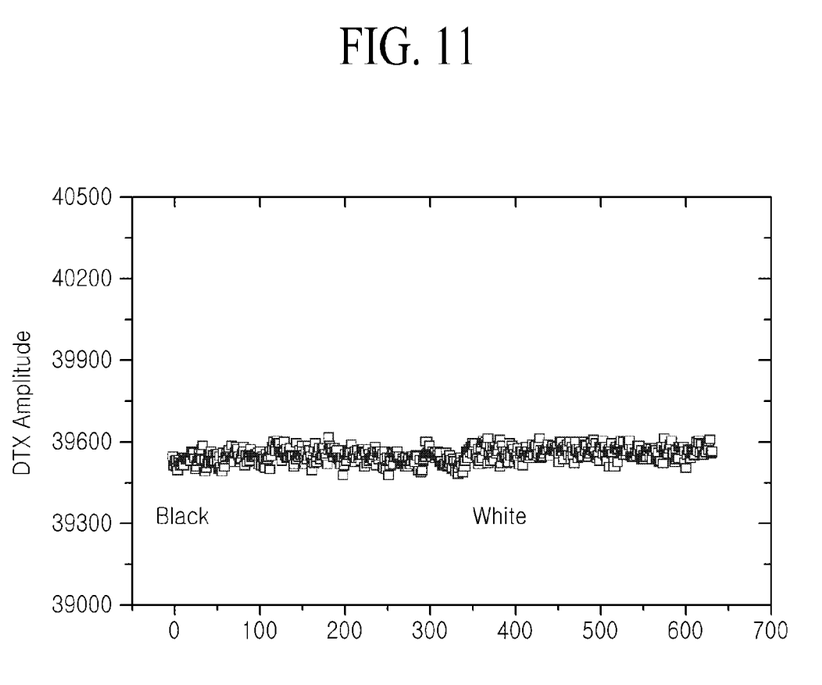
FIG. 11 is a diagram showing a compensation result of an error of touch raw data in the display device according to the present invention.

Like this, in the display mode, when a user's touch is sensed by using a change in touch raw data based on display data applied to a pixel, the following effects shown in FIG. 11 are obtained.

FIG. 11 is a diagram showing a compensation result of an error of touch raw data in the display device according to the present invention.

As seen in FIG. 11, it can be seen that the touch raw data of the first touch sensing block displaying black and the touch raw data of the second touch sensing block displaying white have been compensated for so as to have no difference therebetween. Accordingly, the present invention can solve a touch error that is the limitation of the related art.

Referring again to FIG. 5, the display panel 150 includes the plurality of gate lines GL, the plurality of data lines DL, the plurality of pixel electrodes, and the plurality of common electrodes. The display panel 150 displays a desired image in the display mode, and, in the touch mode, the display panel 150 receives a user's touch.

The gate lines GL are arranged on a substrate in one direction, for example, a width direction. The data lines DL are arranged on the substrate in the other direction, for example, a height direction. Thus, the gate lines GL and the data lines DL are arranged to intersect each other, thereby defining a plurality of pixel areas.

For example, each of the pixels may be one of red (R), green (G), blue (B), and white (W) pixels. The data lines DL may be disposed on a layer different from that of the gate lines GL. The data lines DL may be formed in a straight-line shape, but are not limited thereto. As another example, the data lines DL may be formed in a curved-line shape.

Although not shown, a thin film transistor (TFT) is provided as a switching element in each of a plurality of areas in which the data lines DL intersect the gate lines GL. Each of the thin film transistors may include a gate electrode, a semiconductor layer, a source electrode, and a drain electrode. The gate electrode may be connected to a corresponding gate line GL, the source electrode may be connected to a corresponding data line DL, and the drain electrode may face the source electrode to be separated therefrom.

The structure of the thin film transistor may be variously changed like a bottom gate structure in which the gate electrode is disposed under the semiconductor layer or a top gate structure in which the gate electrode is disposed on the semiconductor layer. Also, a shape of each of the electrodes may be changed to various shapes known to those skilled in the art.

A pixel electrode is provided in each of the pixel areas, and electrically connected to the drain electrode of the thin film transistor. Especially, the pixel electrode may be directly connected to the drain electrode, but is not limited to thereto.

The common electrodes receive a common voltage (Vcom) in the display mode displaying an image, thereby enabling the display of an image. Furthermore, in the touch mode sensing a user's touch, the common electrodes are driven as touch electrodes to detect a touch.

Specifically, in the display mode, the common electrodes generate electric fields together with the pixel electrodes to drive a liquid crystal layer. In an embodiment, each of the common electrodes or pixel electrodes may include at least one or more slits in a corresponding pixel area. A fringe field may be generated between a corresponding common electrode and pixel electrode through the slit, and liquid crystal may be driven with the fringe field.

Each common electrode, as described above, generates an electric field to drive the liquid crystal, and moreover, in the touch mode, each common electrode generate a capacitance together with a touch object (for example, a finger or a pen) so as to enable the sensing of a position touched by a user.

Each of the touch sensing blocks 160 is an area recognized as one area according to a user's touch, and may be formed by patterning the common electrodes that are disposed in the display panel 150 and generate electric fields together with the pixel electrodes to enable the display of an image in the display mode.

In this case, the common electrodes generate electric fields together with the pixel electrodes, which are disposed in the respective pixel areas defined by intersection of the gate lines and data lines that are arranged to intersect each other on the substrate, to enable the display of an image during the display mode. In the touch mode, the common electrodes may act as touch electrodes for sensing a changed capacitance due to a user's touch.

<Touch Sensing Method of Display Device>

Hereinafter, a touch sensing method of the display device according to the present invention will be described in detail with reference to the drawing.

Figure 12:
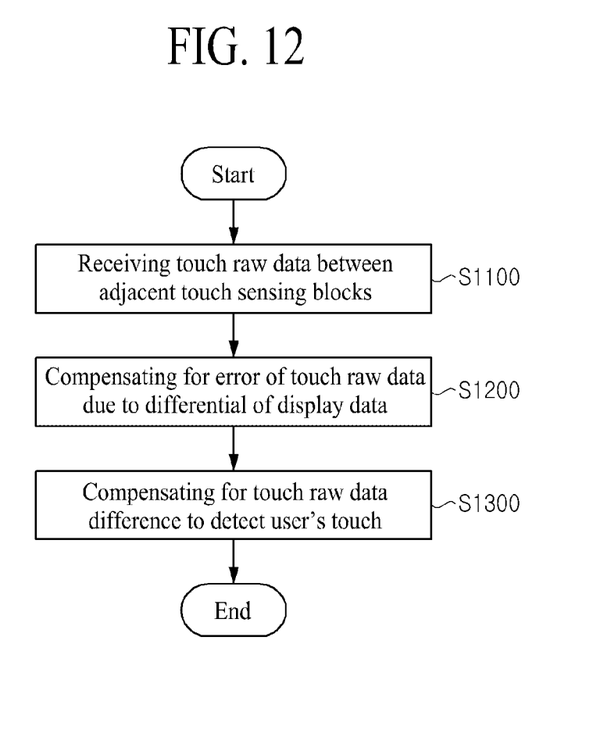
FIG. 12 is a flowchart illustrating an embodiment of a touch sensing method of the display device according to the present invention.

FIG. 12 is a flowchart illustrating an embodiment of a touch sensing method of the display device according to the present invention.

As seen in FIG. 12, the touch sensing method of the display device according to the present invention temporally divides one frame period and drives the display panel 150 such that the display mode for displaying an image in the display panel 150 and a touch mode for sensing a user's touch are alternately driven.

To a detailed description on this, first, the touch sensing method receives a touch raw data difference between adjacent touch sensing blocks in the touch mode, in operation S1100.

According to an embodiment, in the touch mode, operation S1100 may receive the first touch raw data from the first touch sensing block, receive the second touch raw data from the second touch sensing block adjacent to the first touch sensing block, and calculate a difference between the first and second touch raw data as a change amount of the first touch raw data of the first touch sensing block.

Subsequently, in the display mode, the touch sensing method generates a display compensation value for compensating for an error of the touch raw data due to a differential of display data applied to the adjacent touch sensing blocks, in operation S1200.

According to an embodiment, in the display mode, operation S1200 may generate a compensation lookup table in which display data applied to a plurality of pixels corresponding to the touch sensing block are respectively mapped to the change amounts of touch raw data.

Subsequently, the touch sensing method adds the display compensation value to the difference of the touch raw data to detect the user's touch, in operation S1300.

According to an embodiment, in the display mode, operation S1300 receives the first average value of display data applied to the plurality of pixels corresponding to the first touch sensing block and the second average value of display data applied to the plurality of pixels corresponding to the second touch sensing block adjacent to the first touch sensing block, and generates a display compensation value by applying the first and second average values to the compensation lookup table in which display data are respectively mapped to the change amounts of touch raw data.

As described above, the present invention corrects display touch crosstalk, thereby removing noise from a touch signal.

Moreover, noise of a touch signal is reduced, thus enhancing a touch sensing rate by a user.

Moreover, noise of a touch signal is reduced, thus enhancing accuracy of touch sensing by a user.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device, comprising:
a timing controller configured to temporally divide one frame period and drive a display panel such that a display mode for displaying an image in the display panel and a touch mode for sensing a user's touch are alternately driven; and
a touch sensing unit configured to:
detect the user's touch by calculating a difference between touch raw data of adjacent touch sensing blocks in the touch mode, and
in the display mode, generate a display compensation value for compensating for an error of the touch raw data due to a differential of display data applied to the adjacent touch sensing blocks to detect the user's touch,
wherein the touch sensing unit comprises a differential sensing unit configured to, in the touch mode:
receive first touch raw data from a first touch sensing block,
receive second touch raw data from a second touch sensing block adjacent to the first touch sensing block, calculate a first difference between the first touch raw data and the second touch raw data, store the first difference in a compensation lookup table, receive third touch raw data from a third touch sensing block adjacent to the second touch sensing block, calculate a second difference between the second touch raw data and the third touch raw data, store the second difference in the compensation lookup table, receive fourth touch raw data from a fourth touch sensing block adjacent to the third touch sensing block, calculate a third difference between the third touch raw data and the fourth touch raw data, and store the third difference in the compensation lookup table, wherein the first through third differences are change amounts that are respectively mapped to display data in the lookup table.

2. The display device of claim 1, wherein the touch sensing unit comprises a lookup table storage unit configured to store the compensation lookup table in which display data applied to a plurality of pixels corresponding to at least one of the touch sensing blocks are respectively mapped to change amounts of the touch raw data, in the display mode.

3. The display device of claim 1, wherein the touch sensing unit comprises a compensation unit configured to, in the display mode:

receive a first average value of display data applied to a plurality of pixels corresponding to the first touch sensing block and a second average value of display data applied to a plurality of pixels corresponding to the second touch sensing block adjacent to the first touch sensing block; and generate the display compensation value by applying the first and second average values to the compensation lookup table in which the display data are respectively mapped to change amounts of the touch raw data.

4. The display device of claim 1, wherein the touch sensing unit comprises a touch calculation unit configured to add the display compensation value to a change amount of touch raw data, which is a difference between the first touch raw data of the first touch sensing block and the second touch raw data of the second touch sensing block adjacent to the first touch sensing block, to detect the user's touch.

5. A touch sensing method of a display device, which temporally divides one frame period and drives a display panel such that a display mode for displaying an image in the display panel and a touch mode for sensing a user's touch are alternately driven, the touch sensing method comprising:

calculating a difference between touch raw data of adjacent touch sensing blocks in the touch mode;

generating a display compensation value for compensating for an error of touch raw data due to a differential of display data applied to the adjacent touch sensing blocks, in the display mode; and adding the display compensation value to the touch raw data difference to detect the user's touch, wherein the calculating a touch raw data difference comprises, in the touch mode:

receiving first touch raw data from a first touch sensing block, receiving second touch raw data from a second touch sensing block adjacent to the first touch sensing block, calculating a difference between the first and second touch raw data as a change amount of touch raw data of the first touch sensing block store the first difference in a compensation lookup table, receiving third touch raw data from a third touch sensing block adjacent to the second touch sensing block, calculating a second difference between the second touch raw data and the third touch raw data, storing the second difference in the compensation lookup table, receiving fourth touch raw data from a fourth touch sensing block adjacent to the third touch sensing block, calculating a third difference between the third touch raw data and the fourth touch raw data, and storing the third difference in the compensation lookup table, wherein the first through third differences are change amounts that are respectively mapped to display data in the lookup table.

6. The touch sensing method of claim 5, wherein the generating of a display compensation value comprises generating the compensation lookup table in which display data applied to a plurality of pixels corresponding to at least one of the touch sensing blocks are respectively mapped to change amounts of the touch raw data, in the display mode.

7. The touch sensing method of claim 5, wherein the generating of a display compensation value comprises, in the display mode:

receiving a first average value of display data applied to a plurality of pixels corresponding to the first touch sensing block and a second average value of display data applied to a plurality of pixels corresponding to the second touch sensing block adjacent to the first touch sensing block; and generating the display compensation value by applying the first and second average values to the compensation lookup table in which the display data are respectively mapped to change amounts of the touch raw data.

* * * * *